United States Patent [19]

Douglass

[11] Patent Number: 5,303,605
[45] Date of Patent: Apr. 19, 1994

[54] AUTOMATIC TRANSMISSION FOR BICYCLES

[75] Inventor: David S. Douglass, Mesa, Ariz.

[73] Assignee: Automatic Bicycle Co., Mesa, Ariz.

[21] Appl. No.: 14,872

[22] Filed: Feb. 5, 1993

[51] Int. Cl.$^5$ .............................................. F16H 3/08
[52] U.S. Cl. .................................... 74/368; 74/363
[58] Field of Search ............... 74/336 R, 337, 368, 74/369, 363, 333, 336 B, 370; 73/548; 280/236, 238; 192/48.91, 48.92, 64, 103 B, 105 CD

[56] References Cited

U.S. PATENT DOCUMENTS

| | | | |
|---|---|---|---|
| 1,670,403 | 5/1928 | Davidson | 74/368 |
| 2,047,174 | 7/1936 | Baumgartner | 74/367 |
| 2,049,103 | 7/1936 | Baumgartner | 74/363 |
| 2,165,201 | 7/1939 | Baumgartner | 74/363 |
| 3,772,935 | 11/1973 | Dunn et al. | 74/434 |
| 3,977,267 | 8/1976 | Graafsma | 74/434 X |
| 4,301,698 | 11/1981 | Cavanagh | 74/333 X |
| 4,716,777 | 1/1988 | Hartmann | 74/369 |
| 5,099,712 | 3/1992 | Douglass | 74/363 |
| 5,125,489 | 6/1992 | Cha | 192/64 X |

*Primary Examiner*—Dirk Wright
*Attorney, Agent, or Firm*—Cahill, Sutton & Thomas

[57] ABSTRACT

An automatic transmission for mounting within the rear fork of a bicycle includes a plurality of pairs of constant mesh gears and a plurality of discs. Each disc is concentric with one of the gears in each pair and includes a notch for partially enclosing a centrifugally actuated pawl. The notches in adjacent discs face in opposite directions and all the discs but one include a spring for opposing the centrifugal force on each pawl to keep each pawl in a disengaged position. The one disc includes a spring for holding the pawl in an engaged position. The pawls are shaped to permit the bicycle to coast or freewheel.

12 Claims, 3 Drawing Sheets

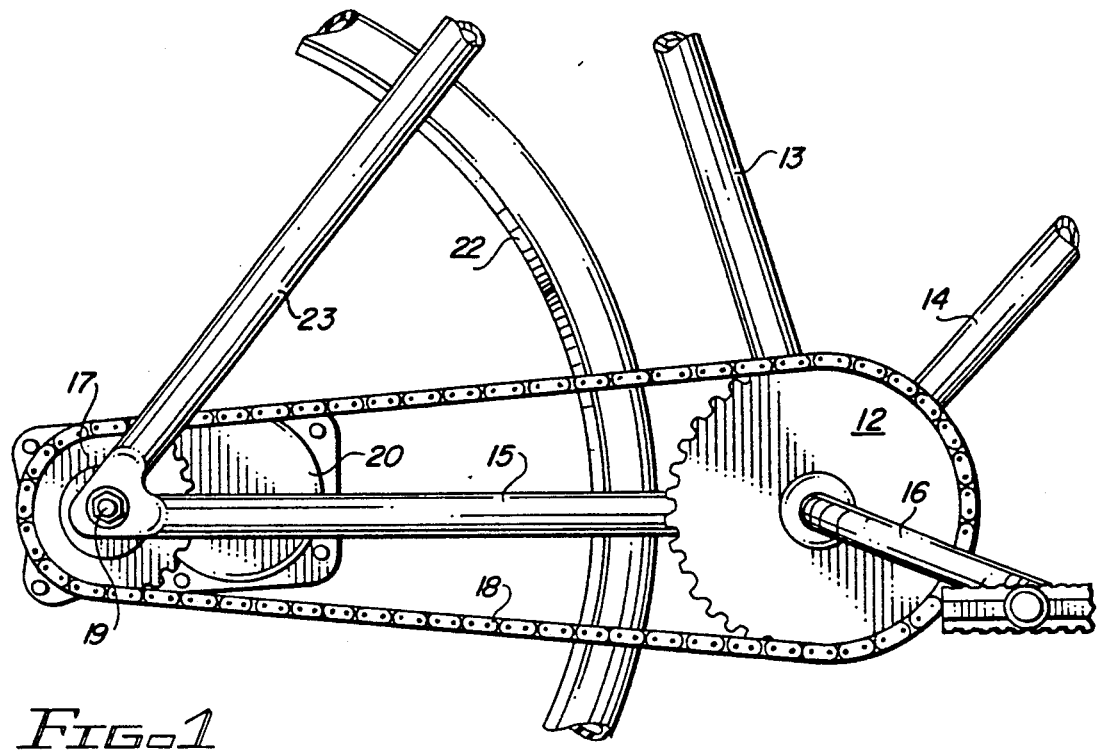
FIG-1
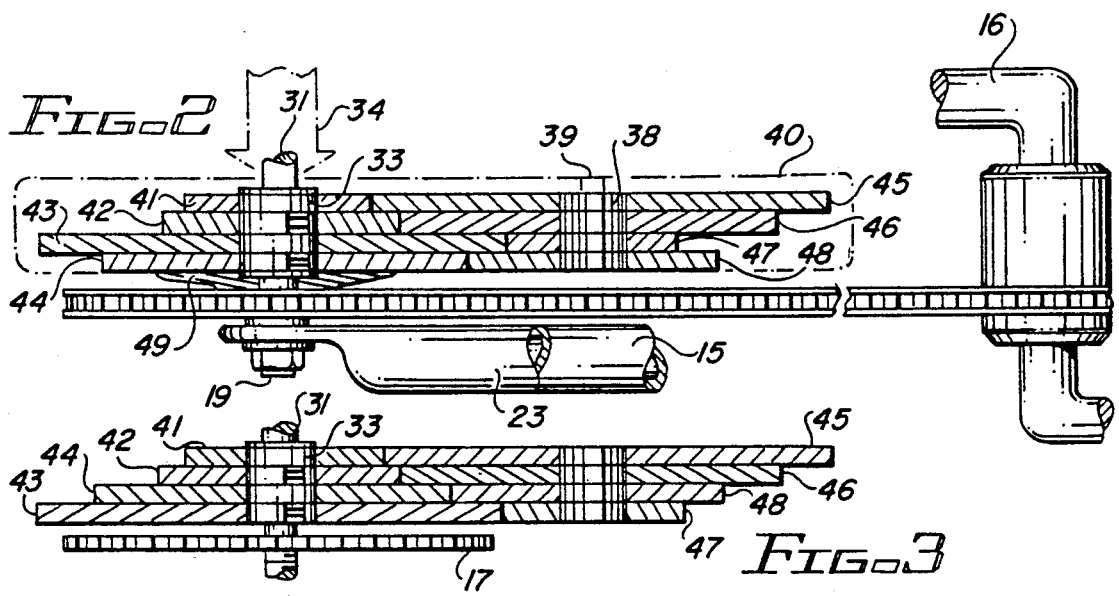
FIG-2
FIG-3
FIG-4

AUTOMATIC TRANSMISSION FOR BICYCLES

BACKGROUND OF THE INVENTION

This invention relates to transmissions for bicycles and, in particular, to an automatic transmission which can be attached within the rear fork of a bicycle.

Beginning with a two wheeled "hobby-horse" in 1816, the bicycle has gone through a long series of changes to make it more comfortable and easier to ride. In 1836, the hobby-horse received pedals attached to the front wheel. The desire for greater speed led to increasing the size of the front wheel, producing the high-wheelers ("ordinarys") of the late 1800's. The front wheel of an ordinary had a diameter as large as sixty inches, making the bicycle unstable and dangerous to ride.

In 1885, the "safety bicycle" introduced chain drive to the rear wheel in a gear ratio that produced as great a speed as an ordinary but on a much more stable bicycle. In 1888, Dr. Dunlop, a veterinarian, replaced the solid tires on his son's bicycle with handmade, inflatable tires and started a new industry. Although the safety bicycle replaced the ordinary, a remnant of the ordinary remains in the anachronism of expressing gearing in terms of the equivalent diameter of the front wheel of an ordinary. It is kept because it provides a way to express gearing independently of the particular implementation on a bicycle.

The early safety bicycles had a single gear and, by today's standards, were geared quite low, making the bicycles slow at ordinary pedalling speeds. After World War II, multi-speed rear hubs and integral coaster brakes provided greater versatility and increased safety for the ordinary cyclist. Shifting gears on a multi-speed rear hub is typically done with a shift mechanism mounted on the handlebars and connected to the rear hub by a cable. A shift lever on the mechanism is moved a pre-set distance and the cable, adjusted to a precise length, moves a pin in the hub the correct amount to effect the gear change. A more rugged mechanism, the derailleur, uses a cluster of several chain sprockets of different diameter and a mechanism which transfers the chain from one sprocket to another, actuated by a cable connected to a shift lever.

Just as for cars with manual transmissions, many people find the shift mechanisms on bicycles inconvenient and confusing. Despite a need for an automatic transmission for a bicycle, none of the many mechanisms proposed have been commercially acceptable. Many are simply too bulky and heavy. Some are not truly automatic, e.g. requiring back pedalling to cause a shift. Others are too expensive relative to the cost of the rest of the bicycle and still others are not sufficiently durable.

In the prior art, a variety of automatic transmissions have been proposed for bicycles. U.S. Pat. No. 3,613,466—Houghton—discloses a mechanism for automatically shifting a derailleur mechanism in response to tension in the chain. U.S. Pat. No. 3,513,725—Shimano—discloses a planetary gear system connected to a ratchet and pawl mechanism in which the pawls are moved by centrifugal force. U.S. Pat. No. 4,598,920—Dutil—discloses a variable diameter rear sprocket in which sprocket teeth are moved radially in response to the rotational speed of the wheel. U.S. Pat. No. 2,165,201—Baumgartner—discloses a foot operated transmission connected to the pedal crank of a bicycle and having a plurality of pairs of constant mesh gears selected by a cam controlled by back pedalling a fraction of a revolution to select the desired pair of gears.

To be commercially viable, an automatic transmission for a bicycle has to be rugged, yet light, compact, and easily made and assembled. This is particularly true when the transmission is to be attached to the rear wheel. Connecting the transmission to the rear wheel has the advantage of not requiring a special bicycle frame, as required, for example, by the transmission disclosed in the Baumgartner patent. To fit with a wheel hub inside the rear fork of a bicycle, a transmission must be narrow, e.g. no more than one inch (2.5 cm.) thick, measured from side to side as mounted on a bicycle. The narrowness of the transmission places a premium on lateral space within the transmission. Pawls, which provide the mechanical coupling between the gears and the hub, must be as wide as possible for strength yet not interfere with one another. The pawls must also be accurately located since tolerances add to the width of the transmission, reducing the number of possible gears.

For ease of manufacture and assembly, there should be as few components, and as few different components, as possible. This not only aids the manufacturer but also reduces spare parts inventories for bicycle shops.

In view of the foregoing, it is therefore an object of the invention to provide an improved automatic transmission for bicycles.

Another object of the invention is to provide a constant mesh, automatic transmission which can be attached to the rear wheel of bicycles.

A further object of the invention is to provide an automatic transmission for bicycles which can be reconfigured to different gear ratios by re-arranging the gears.

Another object of the invention is to provide an automatic transmission for bicycles having constant mesh gears in which the gears on the countershaft can be interchanged with gears on the drive shaft.

A further object of the invention is to provide an automatic transmission for bicycles having constant mesh gears in which the gears on the countershaft are the same as the gears on the drive shaft.

SUMMARY OF THE INVENTION

The foregoing objects are achieved in the invention in which a cluster of annular discs are mounted on a drive shaft. A notch in the periphery of each disc partially encloses a pawl which can move within the notch. A cluster of gears is mounted concentrically on the discs, one gear around each disc. The inside diameters of the gears are faceted to engage a pawl when a tooth on the pawl extends past the inside diameter of the gear. A spring in each disc holds each pawl in a retracted position. When the disc rotates, the pawl is moved into engagement with the gear by centrifugal force, causing the tooth on the pawl to emerge from the notch. For first gear, a spring holds the pawl in an extended position to engage the gear.

The notches in adjacent discs face in different directions away from the drive shaft. Preferably, the notches in alternate discs face in the same direction and the remaining discs face in the opposite direction, i.e. rotated 180°. There are two pins, parallel to the drive shaft, extending through the discs with the pawls in alternate discs mounted on the same pin. This orientation of the discs encloses the sides of each notch, leaving an opening at the periphery of the disc through which the tooth on the pawl can emerge. Each pawl can rotate within its chamber independently of the other pawls. The tooth on each pawl is shaped to permit the drive shaft to turn faster than the gear, thereby enabling the bicycle to freewheel or coast. Circular end plates, having the same inside diameter and outside diameter as the discs, are fastened together, holding the discs between them in a cluster and forming the outside walls of the chambers at the ends of the cluster.

The gears are concentric with the respective discs in the cluster and are slightly narrower than the discs. Spacer bearings in the web of each gear separate each gear from its neighbor. A second set of gears, identical to the first set, is mounted on a core. The outside surface of the core is faceted, interconnecting the gears of the second set which rotate together with the core around a countershaft parallel to the drive shaft. The second set of gears is arranged with the diameters of the gears complementary to the diameters of the gears in the first set of gears and the two sets of gears are in constant mesh.

A chain sprocket is attached to the gear at one end of the drive shaft and the hub of a wheel is attached to the drive shaft. The spring in each disc is adjusted to a predetermined force, thereby causing the pawls to engage their respective gears at progressively higher speeds of the wheel. Power is transferred from the chain sprocket through the attached gear to the gears on the countershaft, then back to the remaining gears on the drive shaft. One of the gears on the drive shaft is connected to the drive shaft by one of the pawls and the remaining pawls are either disengaged or freewheeling. The gears in a gear set can be re-arranged to provide a variety of gear ratios from the same set of gears. There are relatively few different parts and the transmission is quite narrow, about one inch (2.5 cm.) from side to side as mounted on a bicycle.

BRIEF DESCRIPTION OF THE DRAWINGS

A more complete understanding of the invention can be obtained by considering the following detailed description in which:

FIG. 1 illustrates a transmission mounted between the frame and rear hub of a bicycle;

FIG. 2 illustrates in partial cross-section the mechanical relationship between the pedal crank and an automatic transmission constructed in accordance with the invention;

FIG. 3 illustrates an alternative embodiment of a transmission constructed in accordance with the invention;

FIG. 4 illustrates another alternative embodiment of a transmission constructed in accordance with the invention;

DETAILED DESCRIPTION OF THE INVENTION

Figure 5:
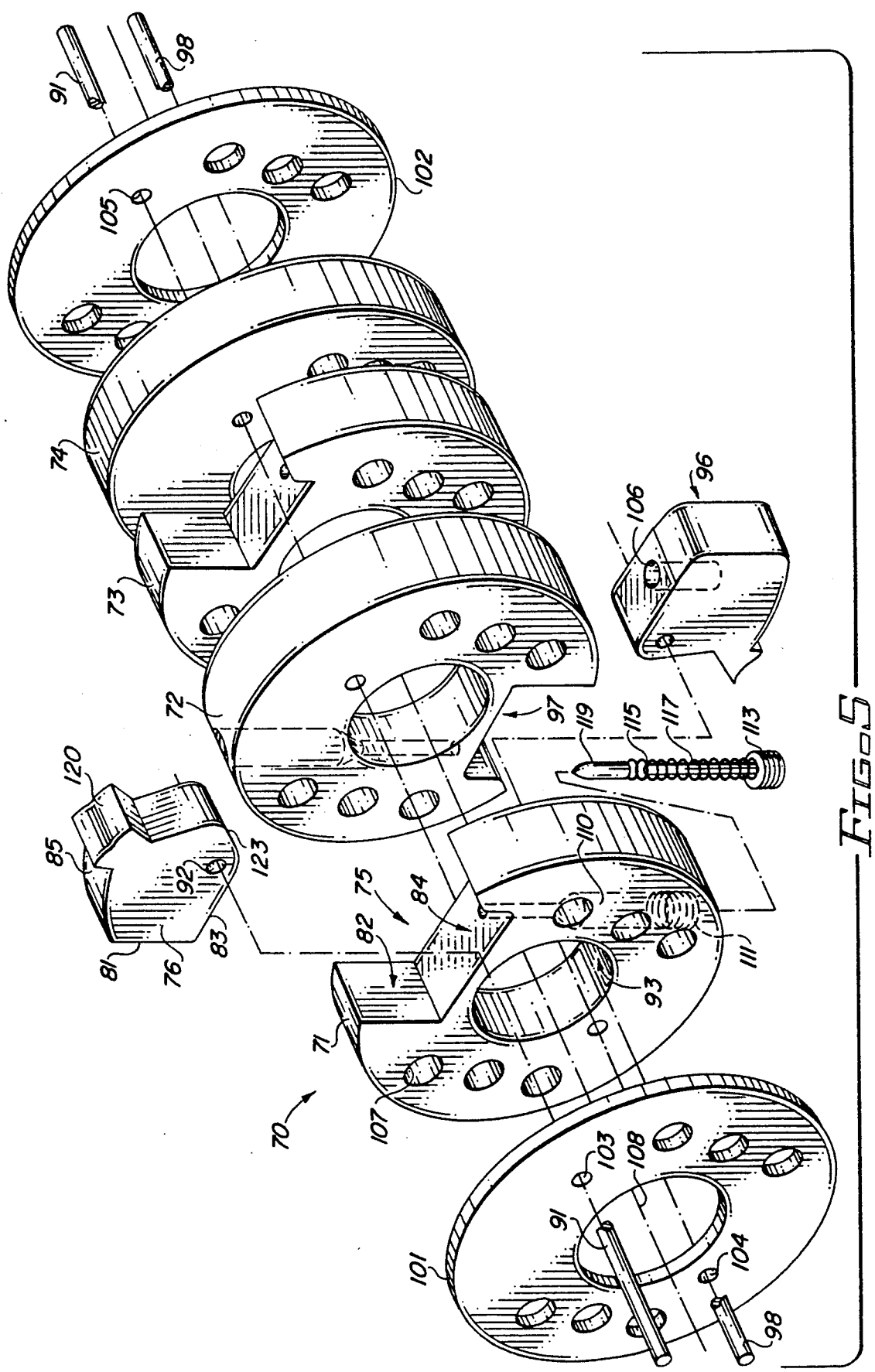
FIG. 5 is an exploded, perspective view of the pawls and discs in a shift mechanism constructed in accordance with the invention.

FIG. 1 illustrates the drive mechanism for bicycle 10 in which pedal sprocket 12 is mounted to a hub, not shown, at the intersection of posts 13 and 14, and horizontal bar 15. Pedal sprocket 12 is turned by crank 16 attached to pedals on each side of the bicycle. Rear sprocket 17 is connected to pedal sprocket 12 by chain 18. Rear sprocket 17 is concentric with rear axle 19 which pass through automatic transmission 20 and rear wheel 22. Axle 19 is mounted at one corner of of a triangle formed by post 13, horizontal bar 15 and bar 23. Bar 23 and post 13 are joined at a point underneath the seat (not shown) of bicycle 10. Horizontal bar 15 and bar 23 are on the right hand side of wheel 22, as illustrated in FIG. 1. A second pair of bars, similarly constructed, on the left hand side of wheel 22 form a fork having the ends thereof joined by axle 19.

Rear sprocket 17 is connected to rear wheel 22 by automatic transmission 20. As pedal sprocket 12 rotates clockwise the motion of pedal sprocket 12 is coupled by chain 18 to rear sprocket 17. The force applied by the cyclist is coupled through transmission 20 to wheel 22. As the rotational speed of wheel 22 increases, a clutch mechanism in transmission 20 automatically changes the gear ratio between rear sprocket 17 and wheel 22. In addition, if the cyclist stops or slows his pedaling, the transmission disengages rear sprocket 17 from wheel 22 and the bicycle coasts. A clamp, not shown, connects transmission 20 to the frame of the bicycle to prevent rotation of the transmission.

FIGS. 2-4 illustrate different arrangements of the gears in accordance with the invention. In FIG. 2, drive shaft 31 is concentrically mounted on rear axle 19 and is connected to axle 19 by suitable bearings, not shown. Drive shaft 31 is connected to clutch 33 and hub 34 of the rear wheel. Parallel to clutch 33 is cylindrical core 38 which turns on axle 39. Concentrically mounted on clutch 33 is a first gear set including gears 41-44. Concentrically mounted on core 38 is a second gear set, including gears 45-48.

In a preferred embodiment of the invention, the gears in the first set are identical to the gears in the second set; that is, gear 41 has the same number of teeth as gear 47, gear 42 has the same number of teeth as gear 48, gear 43 has the same number of teeth as gear 45 and gear 44 has the same number of teeth as 46. Thus, although eight gears are used, only four different gears are necessary for a four speed transmission constructed in accordance with the invention. Axle 19 and axle 39 are parallel to each other and the meshing gears are arranged in complementary pairs; that is, the sum the radii of a pair of meshing gears is equal to the center to center spacing of axle 19 and axle 39.

The operation of the gears may be best understood by first considering FIG. 3 in which an alternative arrangement of the gears is shown. Specifically, in FIG. 3, the gears in each set are arranged in order of size, with the largest gear attached to rear sprocket 17. A cyclist pedaling forward applies a force to the pedal sprocket which is coupled by the chain to rear sprocket 17. Rear sprocket 17 is attached to gear 43, causing it to rotate. Gear 47 is in constant mesh with gear 43 and rotates at a higher speed than gear 43. Gears 45-48 are connected together by core 38 and rotate together at the same speed.

Although gear 44 rotates more slowly than gear 48, gear 44 rotates more rapidly than gear 43 due to the ratios of gears 43:47 and 48:44. Gears 41 and 42 turn faster than gears 45 and 46, with gear 41 turning the fastest.

Clutch mechanism 33 connects gear 43 to the hub when the wheel is at rest or turning slowly; i.e. gear 43 is "first" gear and turns at the same rate as rear sprocket 17. Gear 44 turns at a slightly higher rate and is "second" gear. Gears 42 and 41 turn at still higher speeds and are "third" and "fourth" gears, respectively. The different gears are perhaps more easily understood by considering the following table.

TABLE I

| drive gear | counter gear | ratio | overall ratio | gear (inches) |
|---|---|---|---|---|
| 45 | 27 | 1.67 | 1.00 | 39 |
| 39 | 33 | 0.85 | 1.41 | 55 |
| 33 | 39 | 1.18 | 1.97 | 77 |
| 27 | 45 | 1.67 | 2.78 | 108 |

The gear in the right-hand column assumes a rear wheel having a diameter of 26 inches, a rear sprocket having 20 teeth, and a pedal sprocket having 30 teeth. The first two columns correspond to the gears in FIG. 3 as follows: gear 43=gear 45=45 teeth; gear 44=gear 46=39 teeth; gear 42=gear 48=33 teeth; and gear 41=gear 47=27 teeth. "Ratio" in the top row is the ratio of the drive gear to the counter gear; in the remaining rows, it is the ratio of the counter gear to the drive gear. "Overall ratio" is the drive ratio through all the gears connected between the rear sprocket and the hub of the wheel. The gear, in inches, is the ratio of the pedal sprocket to the rear sprocket times the overall ratio times the diameter of the rear wheel.

As seen from Table I, a transmission having gears arranged as illustrated in FIG. 3 provides gearing from 39 to 108 inches, as would be used for touring. At 108 inches, fourth gear may be too "tall" for the occasional rider. Although the gearing can be changed by substituting gears having different numbers of teeth, the gearing is changed, in accordance with the invention, by re-arranging the gears and connecting gear 44 to sprocket 17, as shown in FIG. 2. Table II shows the gearing obtained with the gears arranged as shown in FIG. 2.

TABLE II

| drive gear | counter gear | ratio | overall ratio | gear (inches) |
|---|---|---|---|---|
| 39 | 33 | 1.18 | 1.00 | 39 |
| 45 | 27 | 0.60 | 0.71 | 28 |
| 33 | 39 | 1.18 | 1.40 | 54 |
| 27 | 45 | 1.67 | 1.97 | 77 |

As shown in Table II, the gearing is now in the range of 28 inches to 77 inches, as would be used for commuting or by the occasional rider. This is a preferred embodiment of the invention and provides four, nicely spaced gears for the cyclist.

In the gear arrangement of FIG. 2, the gear connected to rear sprocket 17 is not "first" gear. Gear 43 is engaged by the clutch mechanism to provide the lowest gear ratio for starting from rest. In a transmission constructed in accordance with the invention, the gears can be arranged in any order and selected in the proper sequence by adjusting the springs countering the centrifugal force on the pawls.

An alternative arrangement of the gears is illustrated in FIG. 4 in which additional gears 61 and 62 are added to the gear sets. Gears 61 and 62 have the same diameter, causing the gear on the counter shaft to rotate at the same speed as the rear sprocket. Table III shows the range of gearing available from this arrangement.

TABLE III

| drive gear | counter gear | ratio | overall ratio | gear (inches) |
|---|---|---|---|---|
| 36 | 36 | 1.00 | 1.00 | 39 |
| 45 | 27 | 0.60 | 0.60 | 23 |
| 39 | 33 | 0.85 | 0.85 | 33 |
| 33 | 39 | 1.18 | 1.18 | 46 |
| 27 | 45 | 1.67 | 1.67 | 65 |

The effect of having the gear connected to the rear sprocket the same size as the gear on the countershaft is to lower the range of gearing. The pawl engaging gear 61 could be eliminated since gearing of 39 inches is superfluous between 33 inches and 46 inches.

FIG. 5 illustrates a clutch mechanism constructed in accordance with a preferred embodiment of the invention. Clutch mechanism 70 includes a cluster of annular discs 71-74 having their centers on a common line. Since discs 71-74 are all constructed in the same way, only disc 71 will be described in detail. Disk 71 includes rectangular notch 75 in the outer edge thereof for housing pawl 76. Surface 81 of pawl 76 is positioned adjacent surface 82 within notch 75. Surface 83 on pawl 76 rests on surface 84 in notch 75. Curved surface 85 on pawl 76 has approximately the same radius of curvature as the outer surface of disc 71. A drive shaft, not shown in FIG. 5, passes through central hole 93 in disc 71.

Pawl 76 rests within notch 75 and rotates about pin 91 which passes through hole 92 in pawl 76. Pawl 96, in downward facing notch 97, rotates about pin 98. Pins 91 and 98 pass through all of the discs, with alternate pawls mounted on pin 91 and remaining pawls mounted on pin 98.

The notches in the discs are not all facing in the same direction away from the driveshaft; i.e. the radius of disc 71 perpendicular to surface 84 extends in a different direction from the radius of disc 72 perpendicular to the corresponding surface in notch 97. Preferably, alternate discs are oriented oppositely, i.e. rotated 180° relative to the adjacent discs. As illustrated in FIG. 5, discs 71 and 73 are oriented with the notches facing upward and discs 72 and 74 are oriented with the notches facing downward. By not having the notches face in the same direction, the sides of one disc are the side walls for the notches in the adjoining discs, making separate chambers for each pawl. The pawls can rotate independently of each other without interference.

Although spread apart for the sake of illustration in FIG. 5, discs 71-74 are adjacent in the transmission, i.e. held together in a cluster between end plates 101 and 102. End plates 101 and 102, having the same inside and outside diameters as the discs, enclose the notches at each end of the cluster of discs. End plate 101 has hole 103 through which pin 91 passes and hole 104 for pin 98. End plate 102 has hole 105, through which pin 91 passes, and a second hole (obscured) for pin 98. The end plates and discs all have their centers located on common centerline 108. Pins 91 and 98 are parallel to the drive shaft and are located along a diameter of the end plates on opposite sides of line 108.

Bore 110 extends along a secant of disc 71 and has an enlarged, threaded outer end 111. An adjustment mechanism, including set screw 113, pin 115, spring 117, and tip 119, is located in bore 110. Set screw 113 fits within the threaded end of the bore and tip 119 rests against surface 123. The adjustment mechanism causes pawl 76 to pivot counter-clockwise about pin 91 and seat within notch 75. In this position, tooth 120 on pawl 76 is within the outside diameter of disc 71. Surface 123 has an angle of about 25° relative to surface 83, i.e. pawl 76 can rotate through an angle of approximately 25° about pin 91. The size of the angle is not critical.

Each adjustment means counters the centrifugal force on the pawls as the clutch rotates. When the bicycle is at rest, one of the gears must be engaged for the cyclist to start pedalling. Bore 106 in pawl 96 receives a spring (not shown in FIG. 5) for biasing the pawl outward from notch 97, pivoting clockwise about pin 98 to engage first gear. The construction of a pawl for first gear is described in more detail in conjunction with FIG. 6.

Figure 6:
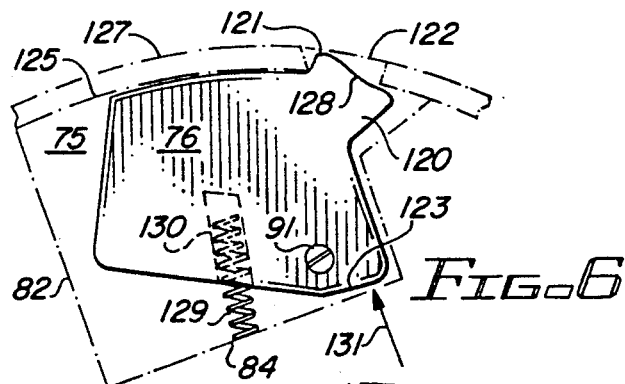
FIG. 6 is a detail showing a pawl engaging the inside, faceted diameter of a gear.
Figure 7:
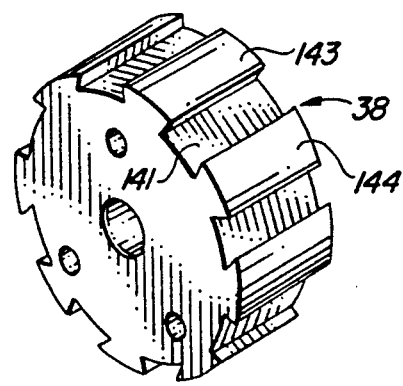
FIG. 7 is a plan view of a gear fitting over a disc in the shift mechanism.

The relationship between the pawl, the disc, and a gear concentric with the disc is illustrated in FIGS. 6 and 7, in which pawl 76 is shown engaging gear 127. In this position, ridge 121 on tooth 120 extends from notch 75 and engages the faceted inner diameter of gear 127. In this position, gear 127 is mechanically coupled by the pawl to the clutch mechanism, which is connected to the hub of the wheel. As the cyclist pedals forward, gear 127 rotates clockwise and ridge 121 on tooth 120 engages notch 122 of gear 127. Tooth 120 rests against the side of notch 75, transmitting the force from the gear to the disc. The force from the gear is not transmitted by pin 91, Which can be quite slender. The discs are secured together and to the hub by bolts which can withstand the shear forces imposed. The bolts pass through holes, such as hole 107 (FIG. 5) in the discs, joining them to the hub of the wheel.

If the cyclist stops pedaling, then the disc containing pawl 76 turns faster than gear 127, rotating clockwise relative to gear 127. Tooth 120 includes slope 128 having a portion within inside diameter 125 of gear 127 and a transition to ridge 121. The right-hand side of notch 122 pushes ridge 121 counter-clockwise, rotating pawl 76 about pin 91. As pawl 76 rotates counter-clockwise about pin 91, tooth 120 is withdrawn into notch 75, permitting the disc to rotate clockwise within gear 127.

When the bicycle is rolling, centrifugal force on the left hand side of pawl 76 rotates pawl 76 clockwise about pin 91. The centrifugal force is opposed by a force, indicated by arrow 131, provided by spring 117 (FIG. 5). The force applied by spring 117 is adjusted by varying the depth to which set screw 113 is inserted into bore 110, compressing spring 117. Thus, even though the pawls and springs are identical in all discs, except for first gear, the pawls can be adjusted to engage their respective gears at different rotational speeds of the rear wheel. Depending upon the speed of the wheel, some of the pawls may be free wheeling while the others are not engaged.

All of the gears are preferably made using what is known as powdered metal technology which has the advantage of producing gears of any desired shape without expensive machining operations. The gears are coated, e.g. with Teflon ®, to provide lubrication. The inside diameter of each gear is faceted or notched as shown in FIG. 7. Ridges 133 alternate with notches 135 around the inside diameter of gear 127. The notches preferably have a dovetail shape, i.e. they are wider at the bottom than at the top. This assures a positive engagement with pawl 71.

Gear 127 also includes spacer bearings 135-137 located in holes through the web of the gear. The gears are slightly thinner than the discs and the spacer bearings in each gear keep the gears separate. The spacer bearings are made from a suitable, low friction plastic, such as Delrin ® or Teflon ®. Additional holes, such as holes 138 and 139, are used for fastening the gear to the rear sprocket.

FIG. 6 also illustrates the operation of a pawl used for first gear. Since first gear must always be engaged, a spring is used to bias the pawl clockwise rather than counter-clockwise. If pawl 76 were for first gear, then the adjustment mechanism for pawl 76 is removed and force 131 is not present. Instead of an adjustment mechanism, spring 129 is placed in hole 130 in pawl 76. Spring 129 rotates pawl 76 clockwise, causing ridge 121 to engage gear 127. As the speed of the rear wheel increases, progressively higher gears are engaged and the clutch rotates clockwise relative to gear 127. Pawl 76 is rotated counter-clockwise against spring 129 as the corner of each notch on the inside diameter of gear 127 engages slope 128.

Figure 8:
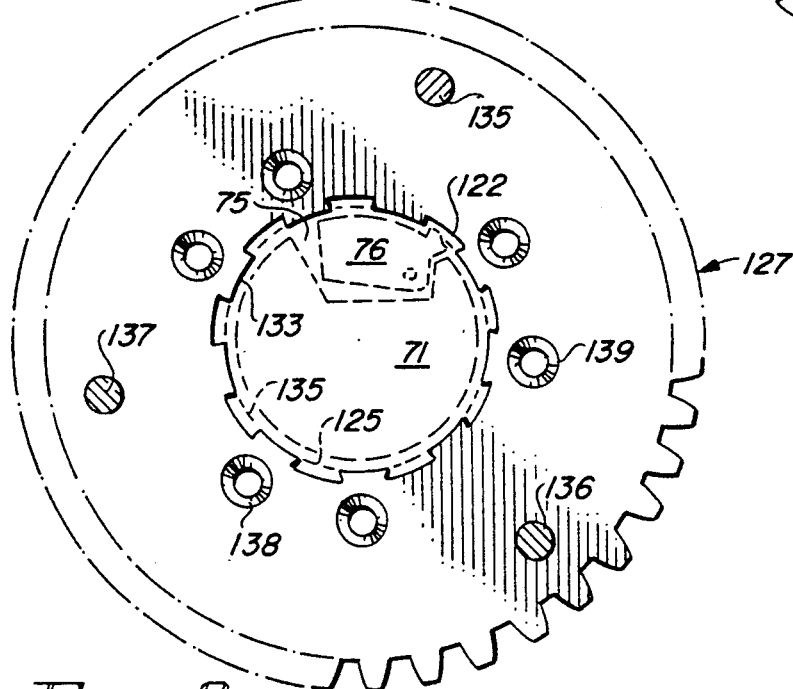
FIG. 8 is a perspective view of a core for interconnecting a set of gears on a countershaft.

FIG. 8 illustrates the core which fits within the gears on the counter shaft. Since the gears on the counter shaft and the gears on the drive shaft are preferably identical and interchangeable, core 38 has an outside surface that is faceted to match the inside surface of the gears; i.e. the notches, such as notches 141 and 143, are wider at the bottom than at the top. Core 38 has the same thickness as the four discs together and is preferably made from aluminum.

Figure 9:
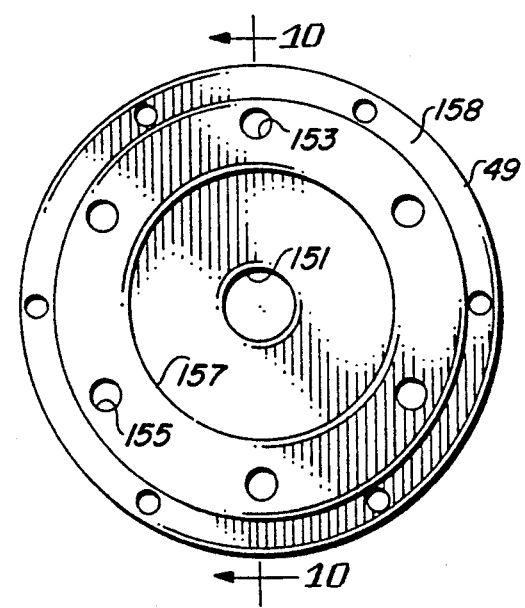
FIG. 9 is a plan view of an end cap for the cluster of discs in the transmission.
Figure 10:
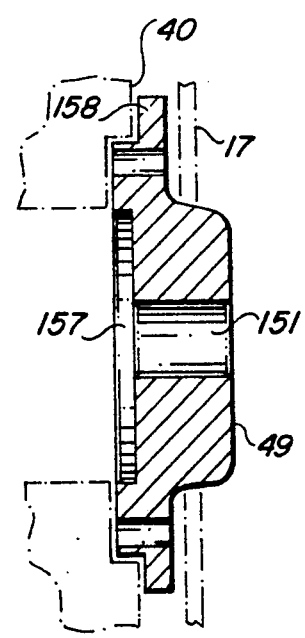
FIG. 10 is a cross-sectional view of the end cap.

FIGS. 9 and 10 illustrate the end cap that goes over one end of the clutch mechanism and connects the clutch mechanism to the rear sprocket. In addition, the end cap provides some protection from dust and dirt by overlying a portion of the case. End cap 49 includes central hole 151, through which axle 19 extends, and a plurality of holes at a predetermined radius from the center of hole 151. The plurality of holes, such as holes 153 and 155, align with holes 138 and 139 (FIG. 7) to connect end cap 49 to the drive sprocket and the outermost gear. End cap 49 includes recess 157 for partially surrounding the end plate at one end of the cluster of disks in the clutch mechanism. End cap 49 also includes lip 158 which extents radially outward to overlie a portion of case 40. This overlap between end cap 49 and case 40 of the transmission provides some protection against dirt and water entering the transmission. A thrust bearing, not shown, is preferably used on each side of end cap 49 for ease of rotation of the end cap relative to the end plate on the cluster of discs and the frame of the bicycle. Flat washers can be used instead of thrust bearings to reduce costs. Flat washers of different thicknesses are used to center the cluster of discs within the gears.

The invention thus provides a compact automatic transmission which fits with the rear wheel inside the rear fork of a standard bicycle frame. At least one pawl in the transmission is in an engaged position and the remaining pawls are either disengaged or freewheeling. The rotational speed of the rear wheel determines how many of the pawls are in an engaged position. When more than one pawl is in an engaged position, the pawl engaging the highest gear automatically causes the remaining pawls to freewheel because the lower speed gears are turning more slowly than the cluster of discs.

Up-shifting takes place automatically since the higher speed gears are turning faster than the cluster of discs. As soon as the tooth of a pawl emerges from its notch, it catches on the faceted inside diameter of the higher gear. Down-shifting is slightly different in that the downshift takes place when there is no load or only a light load on the gear, e.g. when the cyclist pauses pedalling or when the pedals are vertically aligned and the cyclist is pedalling lightly.

Within the transmission, the pawls are contained by adjoining discs to provide a compact structure in which the pawls cannot interfere with each other. The gears are separated and stabilized by spacer bearings in the webs of the gears. As a result, the transmission can be made very narrow yet provide four or more different gears for the cyclist. The range of gearing is readily changed by rearranging the order of the complementary pairs of gears. This permits one to set up the same bicycle for commuting or for off-road activity or for touring. The clutches are all essentially identical even though the clutch for first gear operates differently from the others by always being engaged. The bicycle can coast in all gears.

Having thus described the invention, it will be apparent to those of skill in the art that various modifications can be made within the scope of the invention. For example, while dovetail shaped notches are preferred, any other suitable shape, such as rectangular grooves, or spline fitting, can be used. The number of different gears and the specific gearing is a matter of choice. Powdered metal gears are preferred, although gears machined from steel blanks can be used instead. Any resilient means can be used to bias the pawls. A coiled spring is preferred because of its low cost. Any orientation of the discs can be used as long as the notches do not all face in the same direction. By aligning notches in opposite directions, one can take advantage of the resulting symmetry to align bolt holes and pin holes, requiring fewer holes.

I claim:

1. An automatic transmission for a bicycle, said transmission comprising:
   (a) a drive shaft;
   (b) a countershaft parallel with said drive shaft;
   (c) at least two pairs of gears, wherein
      (i) a first gear from each pair is mounted on said drive shaft,
      (ii) a second gear from each pair is mounted on said countershaft, and
      (iii) the first and second gears in each pair are in constant mesh;
   (d) a centrifugal clutch mechanism interposed between said first gears and said drive shaft for selectively connecting one of said first gears to said drive shaft, said clutch mechanism including
      a first annular disc concentric with a first gear from one of said pairs of gears,
      a second annular disc concentric with a first gear from a second of said pairs of gears;
      each of said discs having
         (i) a peripheral notch for receiving a pawl;
         (ii) a pawl located in said notch, said pawl having a mounting hole about which said pawl can rotate; and
         (iii) a pin parallel to said drive shaft and extending through said mounting hole;
      wherein the notches in adjacent discs face in different directions away from said drive shaft and wherein said pawls are rotated by centrifugal force as said discs rotate about said drive shaft whereby one of said first gears is engaged by said pawl depending upon the rotational speed of said discs.

2. The automatic transmission as set forth in claim 1 and further comprising:
   adjustment means for opposing said centrifugal force.

3. The automatic transmission as set forth in claim 1 wherein said annular discs are mechanically coupled and rotate together at the same speed.

4. The automatic transmission as set forth in claim 1 wherein there are more than two pairs of gears and wherein the notches in alternate discs face in the same direction away from said drive shaft.

5. The automatic transmission as set forth in claim 4 wherein said pins are located diametrically opposite each other about said drive shaft and the pawls from alternate discs are rotatably mounted on a first of said pins and the remaining pawls are rotatably mounted on a second of said pins.

6. The automatic transmission as set forth in claim 1 wherein each of said pawls can rotate about a pin independently of the other pawls.

7. The automatic transmission as set forth in claim 1 wherein a first gear in one pair has the same number of teeth as a second gear in another pair.

8. The automatic transmission as set forth in claim 1 wherein all of said gears are made from powdered metal.

9. The automatic transmission as set forth in claim 8 wherein said gears are narrower than said discs and include at least two spacer bearings attached to a side of each gear for separating each gear from an adjacent gear.

10. The automatic transmission as set forth in claim 8 wherein each gear has an inside diameter which is faceted for engaging a pawl.

11. The automatic transmission as set forth in claim 10 wherein each gear has a plurality of dovetail-shaped notches distributed about the inside diameter thereof.

12. The automatic transmission as set forth in claim 1 wherein one of said discs includes a spring for rotating the pawl within said one disc into a first position and each of the remaining discs includes a spring for rotating the remaining pawls into a second position.

* * * * *